Feb. 14, 1967     S. L. LINDT     3,304,447
LEAD POSITIONER AND ANCHOR FOR DYNAMOELECTRIC MACHINES
Filed Dec. 2, 1963
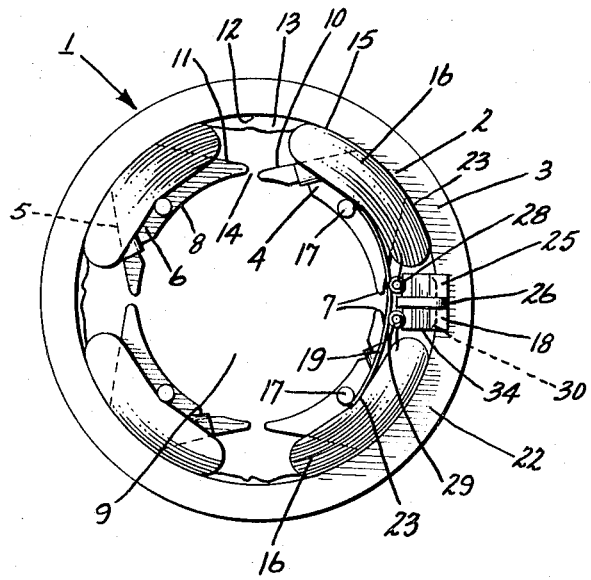
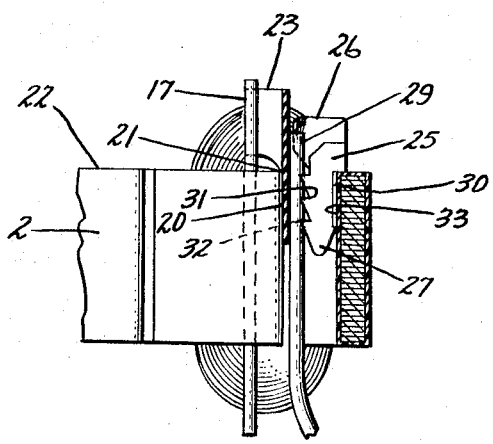
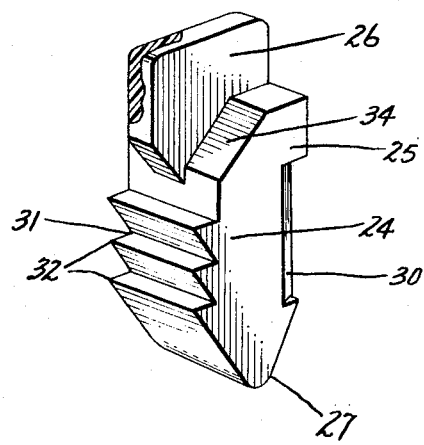
INVENTOR.
Stanley L. Lindt,
BY Edward J. Hanson
Attorney.

United States Patent Office 3,304,447
Patented Feb. 14, 1967

3,304,447
LEAD POSITIONER AND ANCHOR FOR
DYNAMOELECTRIC MACHINES
Stanley L. Lindt, Fort Wayne, Ind., assignor to General
Electric Company, a corporation of New York
Filed Dec. 2, 1963, Ser. No. 327,454
5 Claims. (Cl. 310—71)

My invention relates to lead positioners and anchors and more particularly to lead positioners and anchors for use in the stators of dynamoelectric machines.

In certain applications, it is desirable, if not necessary, that the power source leads attached to the stator winding of a dynamoelectric machine be both positioned and anchored to the stator. This positioning and anchoring is done to prevent the shorting or grounding of the leads and the ends of the winding where they connect. In many cases if a secure anchoring of the power leads is not achieved they will actually be broken wholly away from the stator. Not only does the shorting, grounding or breaking away of the leads interrupt the operation of the machine it also presents a safety hazard if the leads are energized.

Accordingly, it is a principal object of my invention to provide a new and improved lead positioning and anchoring device for use in dynamoelectric machines, which locates the lead wires positively in a predetermined position and holds them securely therein.

It is another object of my invention to provide an improved lead-in arrangement for salient pole stators of electric motors, wherein the leads are positively positioned and securely anchored between adjacent salient poles without the use of expensive tools or the necessity of interfering with other parts of the device.

Briefly stated, in accordance with my invention I have provided an improved lead wire positioning and anchoring arrangement for use in the stator of a dynamoelectric machine. This arrangement includes an improved positioner and anchor member which is mounted in one of the winding slots formed in the stator core. The leads for the winding extend through this same slot and are connected to the winding therein, and the lead positioner and anchor both holds the leads and protects the connections. The positioner and anchor in its preferred form has a body portion with two outer faces on opposite sides. The body is positioned in the slot with one face tightly engaged against two of the leads and the other face tightly engaged against one of the slot walls to hold the lead wires in secure frictional engagement in the slot against extraction. A flange is disposed between the two lead wires to separate them and their connections from one another, and an enlarged body extension at one end of the body limits the distance the body can enter the slot. Thus the lead wires are securely positioned and anchored in the stator.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is a side elevational view of the stator of an electric motor, including the improved lead wire positioning and anchoring arrangement;

FIG. 2 is a fragmentary side elevational view, partly in section, illustrating the relationship of the leads, the separator, the lead positioner and anchor and the stator; and FIG. 3 is an isometric view of my lead wire positioner and anchor with a portion broken away.

Referring now to FIG. 1 of the drawing, for purposes of illustrating my improved embodiment of the present invention, I have shown a stator 1 of the type disclosed and claimed in M. V. De Jean Patent 3,030,528 which is assigned to the same assignee as the present invention. In this stator the core 2 is made of a plurality of stacked laminations of magnetic material. The core has a yoke section 3 and a plurality of adjacent teeth 4 with each tooth in the stator core shown in the drawing forming a separate salient pole. Each of the teeth or salient poles 4 has a narrow neck portion 5 projecting inwardly from the yoke section 3 and a dimensionally wider portion or polar projection 6 having ends or pole tips 7 and an arcuate edge or inner surface 8. The arcuate edges 8 define a central bore 9 for receiving a cooperating rotor (not shown). The outer or side walls 10 and 11 of the poles and the inner or bottom wall 12 of the yoke define a plurality of slots 13. In each slot 13 the pole tips 7 define a narrow slot entrance or neck 14 opening into the central bore 9. A winding 15 is wound on the salient poles 4 to form coils 16 which may be seen in FIG. 1. The turns of adjacent coils pass through the slot which lies between the adjacent poles on which the coils are wound. Winding pins 17 serve to hold the laminations together and retain the end turns of the coil out of interference with other parts of the motor.

In the stator 1 I have provided an improved stator winding lead positioning and anchoring arrangement comprising a lead positioner and anchor 18. The lead positioner and anchor 18 is positioned in the right-hand slot of the stator (as view in FIG. 1) and it is located between the yoke wall 12 and an arcuate separator member 19. The lead positioner and anchor 18 and the separator 19 are preferably made of insulating material so that they may be used in either non-insulated or insulated slots. In the illustrated embodiment, and by way of example, the positioner and anchor 18 is molded of glass-filled nylon. Other suitable materials, can of course, be used in making the lead positioner and anchor.

Referring now to FIG. 2 it can be seen that the separator 19 has an axially extending leg 20 which projects into the right-hand slot 13 and partially closes the slot entrance 14 by the engagement of its side edges against the slot walls 10 and 11 respectively. Two opposite shoulder portions 21 engage the face 22 of the core 2 adjacent the pole tips 7 of the two adjacent poles limiting the distance the leg 20 extends into the slot 13. On either side of the slot the circumferentially extending arms 23 of the separator are engaged with the adjacent coils 16 and winding pins 17 at the point where the coils fit against the winding pins. This engagement causes the separator 19 to be sprung outwardly from the axis of the rotor receiving central bore 9 of the stator 1 as seen in FIG. 1.

My improved lead positioner and anchor 18 may be seen in FIG. 2 to have a main body 24, and a body extension 25. The body extension 25 has a wire separating flange 26. The end 27 of the body 24 opposite the body extension 25 is tapered to aid in its insertion into the slot between the leads 28 and 29 and the yoke wall 12. The opposite outer edges 30 of the body 24 are also tapered to aid in the receipt of the body within the yoke 3 against the arcuate inner yoke wall 12. The body 24 has an inner face 31 having three saw toothed ribs 32 which are slanted toward the body extension 25 and engaged against the leads 28 and 29.

The body 24 is so dimensioned that it fits into a slot 13 between the coils, fitting tightly between the leads 28 and 29 and the inner yoke wall 12. Thus, the lead 29 may be seen in FIG. 2, passing through slot 13 and engaged between the positioner and anchor 18 and the separator 19 with the ribs 32 firmly engaged against the insulation on the lead and compressing it into partial complementary conformity with the configuration of the teeth. The leads are squeezed between the positioner and anchor 18 and the separator 19, and also to some extent between the positioner and anchor 18 and the slot walls 10 and 11 on either side of the separator leg 20. It will be understood that if the separator were eliminated from the motor, as may be desirable under certain circumstances, the leads would then be adequately held in place by their engagement between the anchor and the slot walls. It will be understood that the term "slot walls" is used in its broadest sense herein and includes the separator walls when the separator is present.

Because the insulation on the input lead wires 28 and 29 is resilient, its compression and the resulting pressing back of its resiliency insures a firm frictional engagement between the separator 19, the lead wires 28 and 29, the lead wire positioner and anchor 18 and the walls of the slot 13. The saw toothed ribs 32 aid in the frictional securing of the separator, the lead wire, and the lead wire positioner and anchor in the slot against extraction forces. Because of the direction in which the ribs point they lock the wires against extraction, while on the other hand they allow the lead anchor to be inserted over the wires with only a moderate insertion force during the assembly of the parts in the slot.

It is, of course, possible to use my invention with wires lacking resilient insulation by providing a sufficiently tight engagement or squeezing of the elements, or by making the lead wire positioner and anchor from resilient material. However, I prefer to use the arrangement previously described.

The flange 26 projects from the body extension 25 slightly beyond the outer extent of the ribs 32 and abuts against the separator 19 between the two input leads 28 and 29, where they are connected to the ends of the winding 15, as best seen in FIG. 2. In this region the leads are stripped of their normal insulation and connected to the winding, for example, by soldering, and the flange 26, by separating the leads from one another, insulates them at their connections. The breadth of the body 24 from its inner face 31 to its outer face 33 is sufficient to space the spaced connections from any possible contact with the yoke 3. The body extension has opposite beveled portions 34 on opposite sides of the flange 26. This configuration in cooperation with the separator 19 effectively compartmentalizes the connection next to the coil to which the lead is connected as seen in FIG. 1 (see also FIG. 2). The configuration thereby protects the soldered connections of the input leads to the ends of the winding from damage.

The flange of the body extension 25 projects at a right angle from the body 24 and engages the side face 22 of the yoke 3 to limit the distance the body 24 can enter the slot 13. If a pull is applied to the leads 28 and 29 after they are secured, the projection of the body extension 25 acts as a positive stop and its engagement against the side face 22 of the core prevents the anchor from being pulled through the slot. This in turn results in the leads being securely held against extraction from the slot.

In assembly the separator 19 is inserted in a slot 13 with the ends of arms 23 engaged against the respective adjacent coils 16 and winding pins 17. Then the input leads 28 and 29 are inserted through the slot 13 and the ends of the winding 15 are attached to them. Next the positioner and anchor is inserted between the leads 28 and 29 and the yoke wall 12, with the flange 26 lying between the lead wires 28 and 29 and separating them at their connections to the ends of the winding 15. The positioner and anchor is fully inserted into the slot 13 until the body extension 25 is engaged against the outer face 33. The ribs 32 are firmly engaged with the insulation of the lead wires 28 and 29 and thereby the leads and their connections are securely held in the illustrated position.

Thus, it may be seen that I have provided a new and improved winding lead positioning and anchoring arrangement for use in dynamoelectric machines in which the lead wires are positively located and held in a predetermined position. This result is accomplished by a single positioning and anchoring member which is simple and inexpensive to form and mount within the stator. However, in spite of its simplicity this member provides firm securement of the leads as well as separation and protection of the connections to the winding. My device is particularly useful in positively positioning and securely anchoring input lead wires between adjacent salient poles in salient pole stators.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a stator for a dynamoelectric machine, a core having an energizing winding and at least one slot defined by a plurality of slot walls, a plurality of lead wires connected to said winding, and a lead wire positioner and anchor having a body for positioning and anchoring at least two of said leads in position on said stator, said body having two outer faces on opposite sides thereof, said body being positioned in said slot with one of said outer faces tightly engaged with one of said slot walls and the other of said faces tightly engaged with at least two of said lead wires, thereby to frictionally hold said lead wire positioner and anchor in position in said slot against extraction, and a flange at one end of said body, said flange being disposed between said two lead wires to separate said lead wires and said lead wire positioner and anchor holding said lead wires in position in said slot against displacement or extraction.

2. The combination of claim 1 wherein said body includes an enlarged section at one end thereof for limiting the distance said body can enter said slot.

3. In a stator for a dynamoelectric machine, a core having an energizing winding and at least one slot defined by a plurality of slot walls, at least one lead connected to said winding, and a lead wire positioner and anchor having a body for positioning and anchoring said lead in position on said stator, said body having two outer faces on opposite sides thereof, said body being positioned in said slot with one of said outer faces tightly engaged with one of said slot walls and the other of said faces tightly engaged with said lead, said lead being squeezed thereby between said body face and one of said slot walls and held for retention in said slot against displacement and extraction, and said body including an enlarged extension for limiting the distance said body can enter said slot.

4. A stator for a dynamoelectric machine comprising a plurality of stacked laminations of magnetic material forming a core having a yoke section and a plurality of salient poles extending from said yoke section and with said yoke section defining winding slots therebetween, arcuate inner edges on said salient poles defining a central bore, said core having two side faces, a plurality of winding pins extending through said laminations and projecting from the side faces of said core, at least one of said slots having an entrance defined by the corresponding but opposite tips of the adjacent poles, a winding on said core including coils wound on a plurality of said salient poles and extending through said slots and held clear of said bore by their abutment against respective winding pins, a separator having a leg extending into said one slot and at least partially closing said entrance, said separator having shoulders engaging one side face of said core and two arms engaged respectively against the adjacent coils and winding pins where the coils fit against the winding pins, said separator being sprung by this engagement outwardly from the axis of said bore, two input lead wires extending through said one slot and connected to said winding, a lead wire positioner and anchor having a body portion inserted in said one slot between said lead wires and said yoke section, said lead wires engaged between said lead wire positioner and anchor and said separator and clamped therebetween by being squeezed by the closeness of the fit between the lead wire positioner and anchor and the separator, said lead wire positioner and anchor having a body portion, one end of said body being tapered for insertion into said slot, and a body extension at the other end of said body having one portion extending over and engaging said one side face of said yoke to limit the distance said positioner and anchor extends into said one slot, and a flange portion disposed between said lead wires at their connections to said winding to separate said lead wires where they are stripped of their normal insulation and a plurality of ribs on said body engaging said lead wires to increase the holding ability of said lead wire positioner and anchor.

5. A lead wire positioner and anchor member for receipt in a dynamoelectric machine winding accommodating slot and for anchoring at least two lead wires in position therein, the member comprising a body having two faces on opposite sides thereof, said body having a body extension at one end thereof for exposure beyond the slot and being tapered at the other end thereof for receipt in the slot, said body extension having one portion extending away at a substantial angle from said body, a plurality of saw tooth ribs on one face of said body, said saw tooth ribs slanting toward said body extension and extending transversely across said one face, and a flange extending from said body extension and away from the slot for separating the lead wires one from the other outwardly of the slot.

References Cited by the Examiner
UNITED STATES PATENTS

| | | | |
|---|---|---|---|
| 2,316,635 | 4/1943 | Staak | 310—51 |
| 3,014,140 | 12/1961 | Tupper | 310—71 |

MILTON O. HIRSHFIELD, *Primary Examiner.*

A. J. ROSSI, J. D. MILLER, *Assistant Examiners*